(12) United States Patent
Jensen et al.

(10) Patent No.: US 11,823,008 B2
(45) Date of Patent: Nov. 21, 2023

(54) ALGORITHM CONSOLIDATION (71) Applicant: BRITISH TELECOMMUNICATIONS PUBLIC LIMITED COMPANY, London (GB)

(72) Inventors: Kjeld Jensen, London (GB); Botond Virginas, London (GB); Stephen Cassidy, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 615 days.

(21) Appl. No.: 16/754,515

(22) PCT Filed: Sep. 11, 2018

(86) PCT No.: PCT/EP2018/074467
§ 371 (c)(1),
(2) Date: Apr. 8, 2020

(87) PCT Pub. No.: WO2019/076541
PCT Pub. Date: Apr. 25, 2019

(65) Prior Publication Data
US 2020/0272941 A1    Aug. 27, 2020

(30) Foreign Application Priority Data
Oct. 19, 2017 (EP) .................................... 17197379

(51) Int. Cl.
*G06N 20/00* (2019.01)
*G06N 5/01* (2023.01)
(52) U.S. Cl.
CPC ............... *G06N 20/00* (2019.01); *G06N 5/01* (2023.01)

(58) Field of Classification Search
None
See application file for complete search history.

(56) References Cited

U.S. PATENT DOCUMENTS 6,356,889 B1   3/2002   Lohman et al.
7,805,388 B2   9/2010   Weston et al.
(Continued)

FOREIGN PATENT DOCUMENTS

CN   1795473 A     6/2006
CN   104780217 A   7/2015
(Continued)

OTHER PUBLICATIONS

Combined Search and Examination Report under Sections 17 and 18(3) dated Apr. 22, 2020 for Great Britain Application No. 1915750.2, 7 pages.
(Continued)

*Primary Examiner* — Scott B Christensen
(74) *Attorney, Agent, or Firm* — PATTERSON THUENTE, P.A.

(57) ABSTRACT

This disclosure relates to a computer-implemented method of controlling an algorithm, and a device for implementing said method, the method including developing the algorithm from a first state to a second state by a machine learning process; determining a second computational cost of executing the algorithm in its second state; determining if the second computational cost satisfies a trigger condition; and, if so, consolidating the algorithm from the second state to a third state, wherein a third computational cost of executing the algorithm in its third state is less than the second computational cost.

7 Claims, 4 Drawing Sheets

(56) References Cited

U.S. PATENT DOCUMENTS

| | | | |
|---|---|---|---|
| 8,401,986 | B1 | 3/2013 | Franke |
| 2002/0164070 | A1 | 11/2002 | Kuhner |
| 2004/0059966 | A1 | 3/2004 | Chan |
| 2005/0132052 | A1 | 6/2005 | Uttamchandani |
| 2007/0036339 | A1 | 2/2007 | Cioffi et al. |
| 2007/0174292 | A1 | 7/2007 | Li et al. |
| 2008/0250265 | A1 | 10/2008 | Chang et al. |
| 2009/0177697 | A1 | 7/2009 | Gao et al. |
| 2010/0145647 | A1 | 6/2010 | Bouchard et al. |
| 2011/0051906 | A1 | 3/2011 | Cioffi |
| 2011/0185220 | A1 | 7/2011 | Foley et al. |
| 2012/0251008 | A1* | 10/2012 | Nowozin ............... G06N 20/00 706/12 |
| 2013/0154569 | A1 | 6/2013 | Endo et al. |
| 2014/0068330 | A1 | 3/2014 | Hecox et al. |
| 2014/0156568 | A1 | 6/2014 | Ganguly et al. |
| 2015/0039540 | A1 | 2/2015 | Dong et al. |
| 2015/0106165 | A1 | 4/2015 | Rai et al. |
| 2015/0106485 | A1 | 4/2015 | Chaudhuri et al. |
| 2015/0165525 | A1 | 6/2015 | Jonasson |
| 2015/0185108 | A1 | 7/2015 | Baek et al. |
| 2015/0379426 | A1 | 12/2015 | Steele |
| 2018/0018553 | A1 | 1/2018 | Bach et al. |

FOREIGN PATENT DOCUMENTS

| | | |
|---|---|---|
| EP | 2375637 A1 | 10/2011 |
| IN | 6322/CHE/2015 | 1/2016 |
| WO | WO 2006/129145 | 12/2006 |
| WO | WO-2015165525 A1 | 11/2015 |
| WO | WO-2015185108 A1 | 12/2015 |
| WO | WO 2017/102602 | 6/2017 |
| WO | WO-2017102598 A1 | 6/2017 |
| WO | WO-2019076541 A1 | 4/2019 |

OTHER PUBLICATIONS

Examination Report under Section 18(3) dated Nov. 12, 2020 for Great Britain Application No. 1915750.2, 3 pages.
Extended European Search Report for Application No. 19206266.9, dated Mar. 31, 2020, 8 pages.
International Preliminary Report on Patentability for Application No. PCT/EP2018/074467, dated Apr. 21, 2020, 10 pages.
International Search Report and Written Opinion for Application No. PCT/EP2018/074467, dated Nov. 26, 2018, 13 pages. .
Great Britain Search report, Application No. GB1522390.2, dated Aug. 9, 2016, 6 pages.
International Preliminary Report on Patentability, Application No. PCT/EP2016/080497, dated Jun. 19, 2018, 9 pages.
International Search Report and Written Opinion, Application No. PCT/EP2016/080497, dated Mar. 10, 2017, 11 pages.
EP Search Report, Application No. 15201207.6, dated Jun. 8, 2016, 7 pages.
EP Search Report, Application No. 17197379.5, dated Apr. 20, 2018, 12 pages.
Yang Hang, *Moderated VFDT in Stream 1-10 Mining Using Adaptive Tie Threshold and Incremental Pruning*, Aug. 29, 2011, ECCV 2016 Conference, pp. 471-483.
Basiri J., et al., "An Application of the CORER Classifier on Customer Churn Prediction," Nov. 2012, 6'th International Symposium on Telecommunications (IST'2012), 6 pages.
International Preliminary Report on Patentability for Application No. PCT/EP2016/080491, dated Mar. 8, 2018, 16 pages.
International Search Report and Written Opinion for Application No. PCT/EP2020/075053, dated Mar. 24, 2021, 14 pages.
International Search Report and Written Opinion for PCT Application No. PCT/EP2016/080491, dated Mar. 8, 2017, 10 pages.
Notification of Transmittal of the International Preliminary Report on Patentability for Application No. PCT/EP2020/075053, dated Feb. 28, 2022, 18 pages.
Office Action and Search Report dated Aug. 3, 2020 for Chinese Application No. 201680074231.4, 6 pages.
Written Opinion of the International Preliminary Examining Authority for Application No. PCT/EP2016/080491, dated Nov. 15, 2017, 7 pages.
Written Opinion of the International Preliminary Examining Authority for Application No. PCT/EP2020/075053, dated Oct. 18, 2021, 10 pages.
Written Opinion of the International Preliminary Examining Authority for Application No. PCT/EP2020/075053, dated Jan. 31, 2022, 11 pages.

* cited by examiner

ALGORITHM CONSOLIDATION

PRIORITY CLAIM

The present application is a National Phase entry of PCT Application No. PCT/EP2018/074467, filed Sep. 11, 2018, which claims priority from EP Patent Application No. 17197379.5, filed Oct. 19, 2017, each of which is hereby fully incorporated herein by reference.

TECHNICAL FIELD

The present disclosure relates to a method and apparatus for consolidating an algorithm.

BACKGROUND

An algorithm in a computing system is a set of rules characterizing a particular computation. Traditionally, an algorithm is defined by a computer programmer to define how one or more inputs in a given situation should map to one or more outputs based on a particular goal. The skill involved in defining the set of rules thus scales with the complexity of the given problem. Furthermore, any changes in the inputs, outputs, or goals require the computer programmer to revisit the algorithm and update the rules.

The field of machine learning emerged to automate the development of an algorithm, and is used in many areas of computing (such as autonomic computing systems). Typically, a machine learning process takes an example data set (the "training data") relating to an environment. The machine learning process uses one or more statistical techniques on the training data set to define the set of rules (i.e. the algorithm) which transform an input to an output (usually based on a performance goal). The machine learning process may then subsequently develop the algorithm over time by re-evaluating the set of rules based on any new data and/or performance goal. However, this may lead to the algorithm become increasingly more complex if it encompasses a greater number of rules, increasing its computational burden on the computing system. This problem is particularly acute in a scenario whereby an algorithm is developed by a machine learning process such that execution of a new version of the algorithm requires execution of all previous versions of the algorithm. In this situation, the computational burden increases with every new version of the algorithm.

In supervised learning scenarios, a supervisor may periodically review the algorithm which has been developed by a machine learning process to determine whether or not a consolidation operation should be performed. The consolidation operation acts to reduce the computational burden of the algorithm (such as by reducing the number of rules in the algorithm) whilst trying to minimize the impact on its performance.

SUMMARY

According to a first aspect of the disclosure, there is provided a computer-implemented method of controlling an algorithm, the method comprising developing the algorithm from a first state to a second state by a machine learning process; determining a (second) computational cost of executing the algorithm in its second state; determining if the (second) computational cost satisfies a trigger condition; and, if so, developing the algorithm from the second state to a third state, wherein a further (third) computational cost of executing the algorithm in its third state is less than the (second) computational cost.

Embodiments of the present disclosure provide the benefits that an overly complicated algorithm that has been developed by a machine learning process may be automatically consolidated into a simpler algorithm following a trigger based on the computational resources required to execute the algorithm. This may be particularly useful for algorithms that are susceptible to developing redundant elements over time, such as when the algorithm relates to a highly variable environment, has a very short time delay between iterations, or the performance goal of the algorithm is configured such that it is relatively agile (e.g. low acceptance criteria).

The method may further comprise executing the algorithm in its second state on a first set of inputs relating to a computing system so as to produce a second set of outputs, wherein each of the second set of outputs is one of a first and second possible outputs; executing the algorithm in its third state on the first set of inputs so as to produce a third set of outputs, wherein each of the third set of outputs is one of the first and second possible outputs; determining a first matching value between the second and third sets of outputs.

The method may further comprise determining whether the first matching value satisfies a threshold.

The method may further comprise developing the algorithm from the third state to a fourth state, wherein if the first matching value satisfies the threshold then the algorithm is developed at a first learning rate, and if the first matching value does not satisfy the threshold then the algorithm is developed at a second learning rate.

The algorithm may be a decision tree having a plurality of branch nodes and a plurality of leaf nodes, and the computational cost may be determined based on a count of the plurality of branch nodes.

Developing the algorithm from the second state to the third state may include developing a new algorithm. Alternatively, developing the algorithm from the second state to the third state may include modifying the algorithm from its second state.

According to a second aspect of the disclosure, there is provided a computer program comprising instructions which, when the program is executed by a computer, cause the computer to carry out the method of the first aspect of the disclosure. The computer program may be stored on a computer-readable data carrier.

According to a third aspect of the disclosure, there is provided a device for controlling an algorithm, the device comprising memory for storing data relating to a computing system, and a processor configured to carry out the method of the first aspect of the disclosure.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
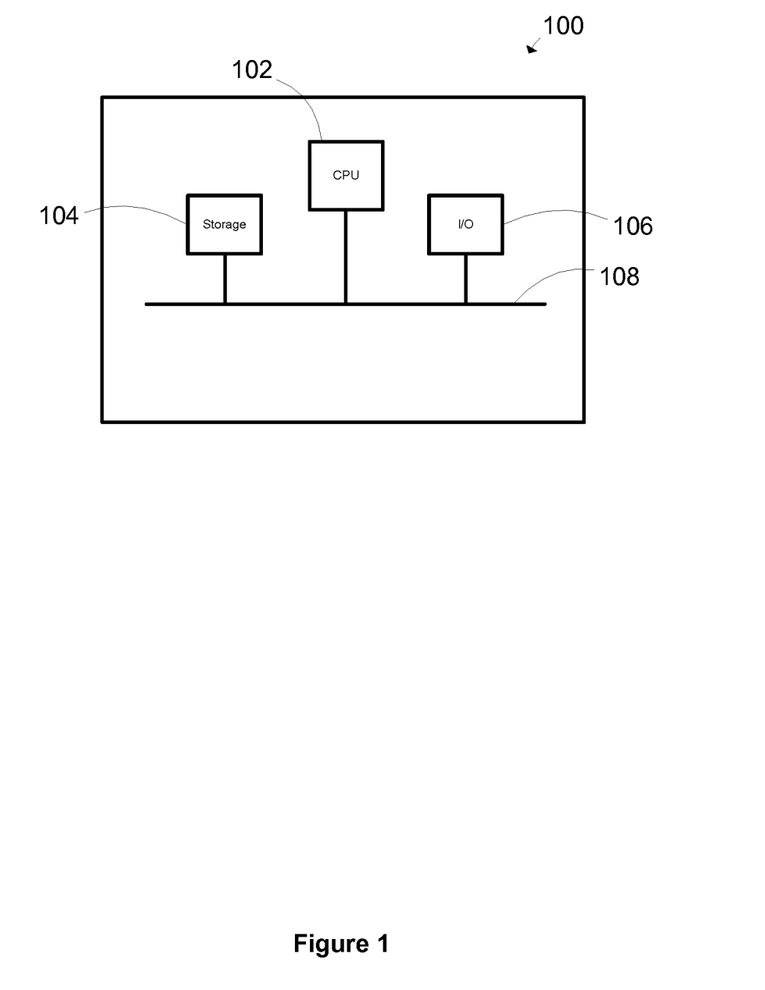
FIG. 1 is a schematic diagram of an embodiment of a computing system of the present disclosure.

FIG. 1 is a block diagram of a computer system 100 suitable for the operation of embodiments of the present disclosure. A central processor unit (CPU) 102 is communicatively connected to storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
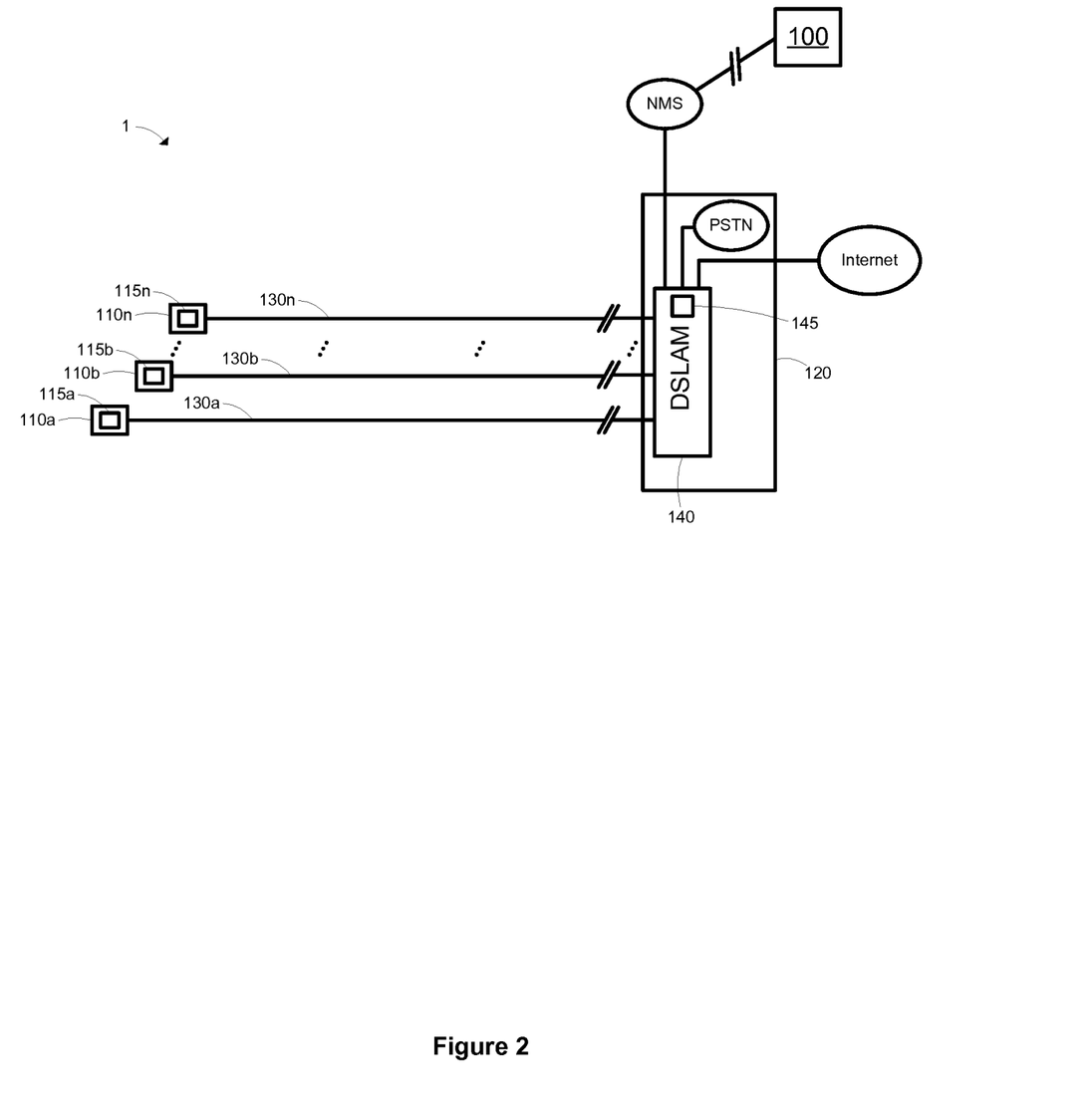
FIG. 2 is a schematic diagram of an example telecommunications system including the computing system of FIG. 1.

FIG. 2 illustrates the computer system 100 in a telecommunications system 1 of an embodiment of the present disclosure. The telecommunications system 1 includes a plurality of Customer Premises Equipment (CPE) 110a . . . 110n connected to an exchange 120, each via a copper pair 130a . . . 130n. The copper pair may use any one of the family of xDSL protocols, such as ADSL, VDSL, VDSL2, G.fast, etc., and may also pass through a further DSL element such as a street cabinet and/or distribution point. Furthermore, the connection between the CPEs and the exchange may be carried in part or in full by an optical fiber connection. To cover all scenarios, the term "line" will hereinafter be used to describe any suitable connection between the CPEs 110a . . . 110n and the exchange 120. In the exchange, the lines 130a . . . 130n terminate at an aggregation transceiver device, in this example a Digital Subscriber Line Access Multiplier (DSLAM) 140, which is configured to provide Internet and telephony services to each CPE via each copper pair. The DSLAM thus provides onward connections to the Internet, to a PSTN, and to a Network Management System (NMS).

The CPEs 110a . . . 110n and DSLAM 140 all include a control unit 115a . . . 115n, 145, which are configured to measure certain properties of a modem located in the CPE or DSLAM, or the associated line, and store them in memory. In this embodiment, the control units 115a . . . 115n, 145 are configured to store DSL-related parameters such as Signal to Noise Ratio (SNR), SNR margin, error counts, retrain counts, etc., which are stored in 15-minute bins in the Management Information Base (MIB). In this embodiment, the control units 115a . . . 115n, 145 are also configured to store non-DSL-related parameters such as the line's resistance, moisture levels, etc., which are also stored in memory. Furthermore, each line 130a . . . 130n may include a further control unit (not shown), provided at any point along its length, which is also configured to perform measurements of the various DSL-related and non-DSL-related parameters noted above.

The various control units 115a . . . 115n, 145, 160a . . . 160n are all configured to report their stored DSL-related and non-DSL-related parameters to the NMS. In this embodiment, the NMS receives this data once per day and each day's data is stored, creating a timeline of operational data for subsequent analysis.

In an embodiment of the present disclosure, the computer system 100 is configured to retrieve this data from the NMS and store it as a vector of quantities, hereinafter designated 'x'. The computer system 100 uses data x in an autonomic process to control the telecommunications system 1. A detailed example of one such autonomic process will now be described in detail. The skilled person will note, however, that the telecommunications system 1 is just one example of a computing system and the various aspects and embodiments of the disclosure described hereinafter are applicable to any computing system.

In the telecommunications system 1, a user of one CPE may terminate their service with the Network Operator such that the user's line becomes inactive. After some time has passed, the user requests that their service be restarted, and the Network Operator must decide whether to a) automatically restart the service without sending out an engineer, or b) send an engineer out to inspect the line and associated infrastructure, perform any necessary engineering work to restore the line to full working condition, and manually restart it. There is a greater chance of developing a fault with option a) over option b), and such a fault would have a negative impact on the customer experience. However, there is a greater financial cost associated with option b) over option a). Accordingly, the Network Operator must make a decision on which lines it would be beneficial to use option a) over option b).

In this embodiment, an algorithm is used to decide whether the Network Operator should automatically restart the service or send an engineer to manually restart it. This algorithm may take into account, for example, the amount of time that has passed since the Network Operator terminated service to that user, DSL fault statistics of neighboring lines, and the various DSL-related and non-DSL-related data noted above. The algorithm thus takes the stored diagnostic data x as an input and outputs either option a) or option b).

The Network Operator may then act upon this output. With either option a) or option b), there are two possible outcomes. One option is a success, which in this example means that the service is successfully restarted without a fault occurring in the near future. The second option is a failure, in which the service does not successfully restart and enters a fault state either immediately or shortly after restarting.

Figure 3:
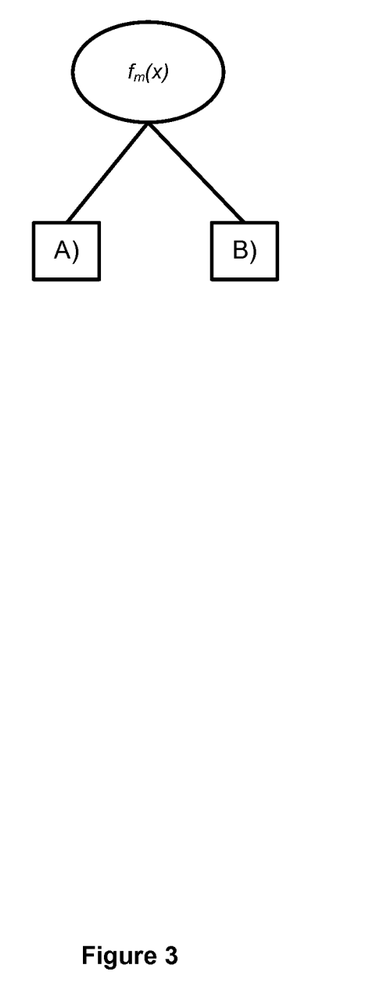
FIG. 3 is a diagram of an embodiment of a decision tree algorithm of the present disclosure.

An embodiment of a method of present disclosure will now be described with reference to FIGS. 3 to 4. In this embodiment, the autonomic process involves the development of a decision tree algorithm which classifies each line as either option a) or option b) based on its input data, x. The algorithm $V_0$ is initially in the form as illustrated in FIG. 3, in which a line may be classified as either option a) or option b) based on a single data point indicating the amount of time that has passed since the Network Operator terminated service to that user. Thus, the decision tree incorporates a single decision node m, which implements test function $f_m(x)$ on the input data x, and there are two leaf nodes for option a) and option b) respectively. In this example, the algorithm in its initial form ($V_0$) was defined by a human operative, but the skilled person will understand that it may have been defined by a data mining technique acting upon training data for the telecommunication system 1.

Figure 4:
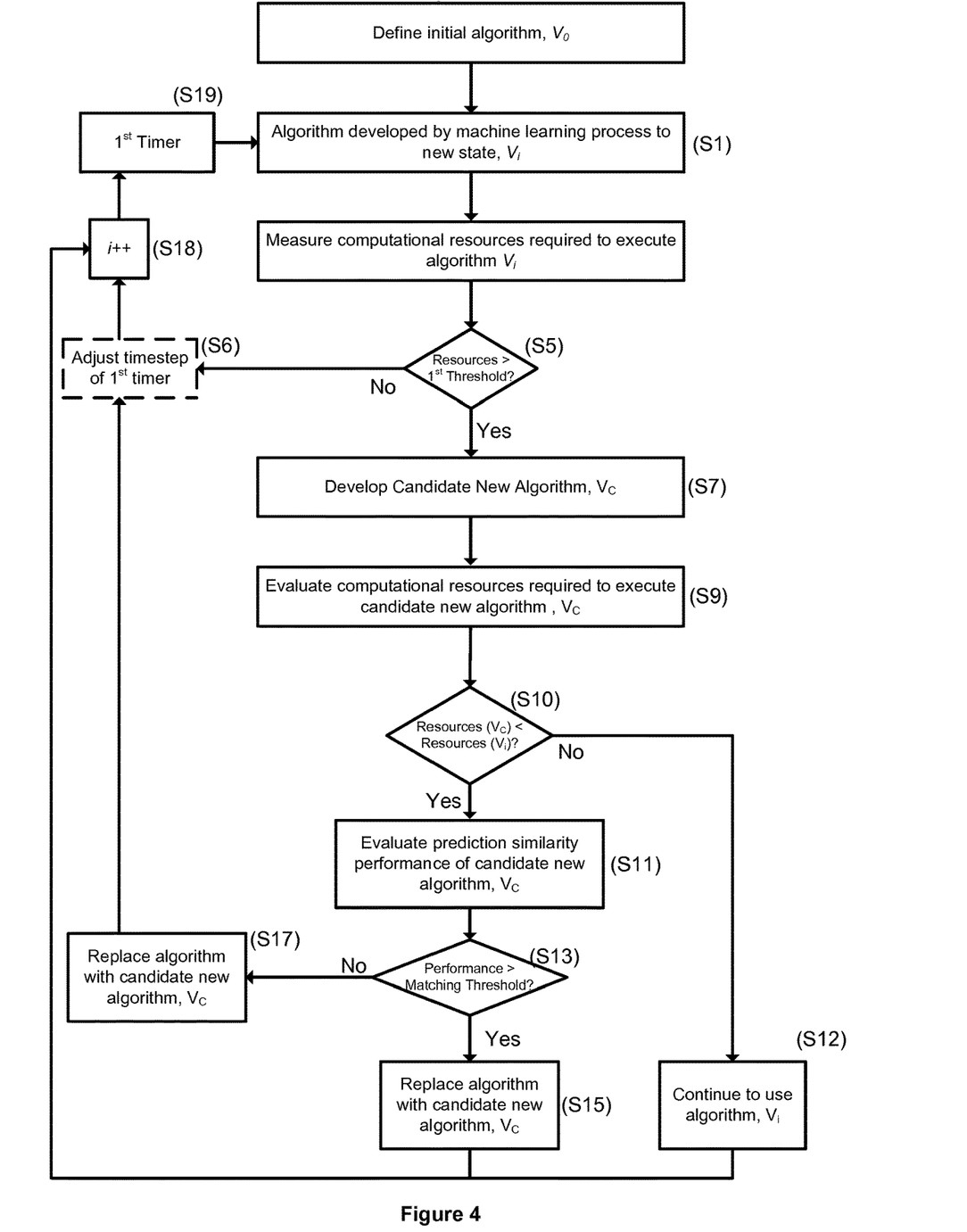
FIG. 4 is a flow diagram illustrating an embodiment of a method of the present disclosure.

In S1 of this embodiment as shown in the flow diagram of FIG. 4, the computing system 100 uses a machine learning process to develop the decision tree algorithm from its first state to a second state. In this embodiment, the machine learning process operates by developing a number of candidate decision tree modifications (e.g. splitting a leaf node into a branch node with the addition of a new test function, or by modifying a criterion of a test function of an existing branch node), and evaluating the prediction accuracy of each candidate decision tree modification against a recent data set. The recent data set includes data for each line including the input data, x, and the real-world outcome on whether an automatic or manual restart for that line—options a) or b)—were successful or not. This analysis therefore gives an objective measurement of each candidate decision tree modification's prediction accuracy by comparing its predicted outputs for each line (using the input data, x, from the recent data set) to the real-world outcomes from the recent data set. The most accurate candidate decision tree modification is then selected as the new state of the algorithm.

In S3, the computing system 100 measures the computational resources required to execute the algorithm in its new state. There are many methods available for performing such a measurement, which may be as simple as a count of the number of test functions (i.e. branch nodes) in the decision tree, or may be based on the application of the decision tree algorithm in its current form to an evaluation data set (which should be representative of the current operating environment) and monitoring the performance of the processor 102 (e.g. run-time, utilization, etc.).

In S5, the computing system 100 determines whether the computational resources required to execute the algorithm in its new state satisfy a condition, which in this embodiment is a first resource threshold predetermined by an operator. If not, then the method of this embodiment loops back to S1 such that the algorithm is developed to a further new state. As shown in FIG. 4, the loop between S1 and S5 includes a timer (S19) to implement a timestep between each iteration, which may be adjusted in S6 in order to modify the learning rate of the algorithm. Furthermore, the computing system 100 implements a counter in S18 to distinguish between iterations of the loop between S1 and S5. In this example, the computational resources required to execute the algorithm in its new state, $V_j$, exceed the first resource threshold and the method proceeds to S7.

The aim of the following aspects of this process is to produce a new algorithm which is computationally less expensive than the previous algorithm, $V_i$ (hereinafter the "pre-consolidation algorithm") whilst producing the same or similar results. These aspects will now be explained.

In S7, the computing system 100 creates a candidate new algorithm, $V_C$, which is developed using a machine learning process whereby the performance goal is to match the output of the candidate new algorithm, $V_C$, to the output of the pre-consolidation algorithm, $V_i$.

In S9, the computing system 100 measures the computational resources required to execute the candidate new algorithm, $V_C$, and in S10, evaluates whether the candidate new algorithm, $V_C$, is less computationally expensive than the pre-consolidation algorithm, $V_i$. This is achieved by using the techniques outlined in S3 for both the pre-consolidation algorithm, $V_i$, and the candidate new algorithm, $V_C$, and then comparing the two measurements. If the candidate new algorithm, $V_C$, is less computationally expensive then it is accepted and the method proceeds to S11. If the candidate new algorithm, $V_C$, is as computationally expensive or more computationally expensive than the pre-consolidation algorithm, $V_i$, then it is rejected and the algorithm remains as the pre-consolidated algorithm, $V_i$ (S12), and the method loops back to S1 via S18 and S19. In this example, the method proceeds to S11.

In S11, the computing system 100 evaluates the prediction similarity performance of the candidate new algorithm, $V_C$, compared to the pre-consolidation algorithm, $V_i$. In this embodiment, this is achieved by executing the algorithm in both its new state, $V_C$, and in its pre-consolidated state, $V_i$, using a recent data set (including the input data, x) which outputs a first set of predictions for the candidate new algorithm, $V_C$, and a second set of predictions for the pre-consolidated algorithm, $V_i$. The computing system 100 may then compare a count of instances in which the pre-consolidated algorithm, $V_i$, and the candidate new algorithm, $V_C$, give the same or different predictions based on the same input data. In this manner, the computing system 100 is therefore evaluating the similarity of predictions (i.e. the "closeness") of the candidate new algorithm, $V_C$, to the pre-consolidated algorithm, $V_i$. In this embodiment, this is achieved using a confusion matrix to determine the distance, d, between the pre-consolidation algorithm $V_i$ and the candidate new algorithm, $V_C$:

|  | $V_i$ - Option a) | $V_i$ - Option b) |
| --- | --- | --- |
| $V_C$ - Option a) | $d_{00}$ | $d_{01}$ |
| $V_C$ - Option b) | $d_{10}$ | $d_{11}$ |

Where:

$d_{00}$=count of instances in which the pre-consolidation algorithm outputs option a) for a line in the input data and the candidate new algorithm outputs option a) for the same line in the input data;

$d_{01}$=count of instances in which the pre-consolidation algorithm outputs option b) for a line in the input data but the candidate new algorithm outputs option a) for the same line in the input data;

$d_{10}$=count of instances in which the pre-consolidation algorithm outputs option a) for a line in the input data but the candidate new algorithm outputs option b) for the same line in the input data;

$d_{11}$=count of instances in which the pre-consolidation algorithm outputs option b) for a line in the input data and the candidate new algorithm outputs option b) for the same line in the input data; and $$d = \frac{d_{01} + d_{10}}{d_{00} + d_{01} + d_{10} + d_{11}}$$

The distance metric, d, is therefore a ratio of misclassifications to the total number of classifications between the two algorithms, $V_C$, $V_i$. Although not essential, the distance matrix may also apply different weightings to the two types of misclassifications in order to penalize misclassifications of one kind more than the other. This is advantageous when the operator determines that it is more important to keep one class of misclassifications to a minimum (e.g. at the expense of the other misclassification).

In S13, the computing system 100 compares the distance metric to a matching threshold to determine if the performance of the candidate new algorithm, $V_C$, is acceptable. In this embodiment, the prediction similarity threshold is set at 5%, such that the candidate new algorithm may only misclassify up to 5% of lines in the recent data set in order to satisfy the threshold. If the matching threshold is met, then the candidate new algorithm, $V_C$, is accepted to replace the pre-consolidated algorithm, $V_i$, (S15) and the method loops back to S1 (via S18 and S19).

This embodiment of the disclosure therefore has the advantage that the algorithm's development may be analyzed to determine whether the computational resources required to execute the algorithm become greater than a threshold. If so, then the computing system 100 may automatically consolidate the algorithm to one that requires fewer resources to execute and that produces the same or similar results to the pre-consolidated algorithm, $V_i$. In this manner, the consolidated algorithm retains some or all of the cumulative learning acquired up to that point (which was embodied in the previous mapping between inputs and outputs by the pre-consolidated algorithm) but is now less burdensome on the computational resources of the computing system 100.

In an alternative scenario of S13, the prediction similarity performance does not satisfy the matching threshold. In this case, the candidate new algorithm, $V_C$, is accepted to replace the pre-consolidated algorithm, $V_i$, (S17) but the method then loops back to S1 via S6, S18 and S19, in which the first timer is adjusted to adopt a new, shorter, timestep between subsequent iterations of S1 to S5. In this manner, the algorithm is consolidated in order to decrease the computational burden on the computing system 100, but the learning rate of the new algorithm, $V_{i+1}$, is increased by virtue of the shorter timestep such that any predictive performance degradation is short-lived. After several iterations, the first timer may be re-adjusted in S6 to adopt longer timesteps between iterations (e.g. the same as the original timestep).

The above embodiment of the disclosure is applied to a decision tree algorithm being used in an example scenario for determining whether a DSL in a telecommunications system should be automatically or manually restarted. However, the skilled person will understand that, firstly, the invention may be applied in any computing system scenario. For example, a data centre may comprise a number of resources which are either operational or dormant. The data center operator may then decide on whether to automatically deploy the dormant resource to a user, or whether to manually review and configure the resource for deployment. Data may be collected for the data center (covering, for example, the length of time since the resource was last used and/or operational data) and a decision tree algorithm may be used to make the above decision, which may also be developed using a machine learning process. This algorithm may therefore benefit from the advantages of the present disclosure, in which the computational resources required to execute the decision tree algorithm may be reviewed and, if the resource usage is above a threshold, then the decision tree algorithm may be consolidated.

Furthermore, the disclosure may be applied to other forms of algorithms that may be developed by machine learning processes. For example, the algorithm may be based on any one of the following (non-exhaustive list of) algorithm types that may be developed by machine learning processes: neural networks, binary regression, Hidden Markov Models (HMM), random forests, or support vector machines. Using any one of these algorithm types, the computing system 100 may be configured to periodically measure the computational resources required to execute the algorithm and compare this to a criterion for triggering a consolidation process. The consolidation process may then act to reduce the computational burden of the algorithm (e.g. by creating a new, less computationally complex, algorithm, or by modifying the existing algorithm to reduce its computational burden).

Furthermore, the skilled person will understand that it is not essential that the consolidated algorithm be based on the same form as the pre-consolidated algorithm. That is, the computing system 100 may utilize a completely different form of algorithm (e.g. a neural network) to replace the pre-consolidated algorithm (e.g. a decision tree), so long as the computational resources required to execute the new algorithm are less than the pre-consolidated algorithm. The computing system 100 may also determine the "closeness" of the algorithm of a different form to the pre-consolidation algorithm in order to determine if the learning rate of its future development rate should be adjusted. Furthermore, the machine learning process may operate to produce an additional algorithm which operates in sequence to all previous versions of the algorithm (such that performance of the new algorithm requires performance of all previous versions of the algorithm), and these additional algorithms may be of the same or different form to those used in previous versions. It is noted that the present disclosure is particularly applicable to these algorithms having a sequential nature, as the computational resources required to execute each new version of the algorithm increases with each development.

The skilled person will also understand that it is not essential for the computing system 100 to evaluate the prediction similarity performance of the candidate new algorithm (i.e. the "closeness" of the candidate new algorithm to the pre-consolidated algorithm) and compare it to a threshold. However, in doing so, the computing system 100 ensures that any cumulative learning of the pre-consolidated algorithm is maintained following the consolidation process.

In the above embodiments, the computing system 100 measures the computational resources required to execute the algorithm upon each iterative development of the algorithm. However, the skilled person will understand that this is non-essential, and the method may also be implemented by monitoring the computational resources following other triggers, such as:

After a particular number of iterations of the machine learning process since the last consolidation;

After a particular time period has elapsed since the last consolidation.

In all cases, the trigger may be specified as an absolute threshold appropriate to the metric, or as a relative change since the last consolidation function.

In the above embodiments, the computing system 100 executes the algorithm but the inputs/outputs of algorithm relate to another computing system (the telecommunications system 1). However, the skilled person will understand that the algorithm may be implemented in the same computing system which the algorithm is acting upon.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the disclosure.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer-implemented method of controlling an algorithm, the method comprising:
   providing the algorithm in a first state, wherein the algorithm in each of a plurality of states of development is executable by a computing device using computational resources to produce one or more outputs based on one or more inputs, the algorithm in the first state has a first computational cost associated with computational resources for producing the one or more outputs, and the first computational cost is below a predetermined threshold;
   developing the algorithm from the first state to a second state by a machine learning process, wherein the second state has a second computational cost associated with computational resources for producing the one or more outputs;
   determining the second computational cost, the second computational cost being greater than the first computational cost;
   determining that the second computational cost is above the predetermined threshold; and
   based on the second computational cost being above the predetermined threshold, developing the algorithm from the second state to a third state by the machine learning process, wherein developing the algorithm from the second state to the third state comprises developing the algorithm such that the third state has a third computational cost associated with computational resources for producing the one or more outputs less than the predetermined threshold, wherein each of the first state, the second state, and the third state are different.

2. The method as claimed in claim 1, further comprising:
   executing the algorithm in the second state on a first set of inputs relating to a computing system so as to produce a second set of outputs, wherein each of the second set of outputs is one of a first possible output or a second possible output;
   executing the algorithm in the third state on the first set of inputs so as to produce a third set of outputs, wherein each of the third set of outputs is one of the first possible output or the second possible output; and
   determining a first matching value between the second set of outputs and the third set of outputs.

3. The method as claimed in claim 2, further comprising determining whether the first matching value satisfies a new threshold.

4. The method as claimed in claim 3, further comprising:
   developing the algorithm from the third state to a fourth state,
   wherein if the first matching value satisfies the new threshold then the algorithm is developed at a first learning rate, and if the first matching value does not satisfy the new threshold then the algorithm is developed at a second learning rate.

5. The method as claimed in claim 1, wherein the algorithm is a decision tree having a plurality of branch nodes and a plurality of leaf nodes, and the computational cost is determined based on a count of the plurality of branch nodes.

6. The method as claimed in claim 1, wherein developing the algorithm from the second state to the third state includes developing a new algorithm.

7. The method as claimed in claim 1, wherein developing the algorithm from the second state to the third state includes modifying the algorithm from the second state.

* * * * *